3,219,597
CELLULAR POLYSTYRENE

Pierre Emile Boutillier and Jacques Louis Gourlet, Paris, France, assignors to Manufactures de Produits Chimiques du Nord Etablissements Kuhlmann, Paris, France, a corporation of France
No Drawing. Filed Jan. 23, 1961, Ser. No. 83,898
Claims priority, application France, Jan. 28, 1960, 816,943, Patent 1,255,943
2 Claims. (Cl. 260—2.5)

This invention relates to a lightweight cellular composition of matter capable of withstanding high pressures and high mechanical stresses in compression, tension and bending.

Heretofore cellular materials were chiefly designed for the purpose of providing heat and/or sound-proofing or insulation, or as yielding materials for the damping of shock and vibration. Such materials generally have a very low specific gravity. They are not capable of withstanding forces higher than say a few kilograms per square centimeter in compression or in tension.

In many cases however it would be desirable to provide a lightweight cellular material capable of withstanding very severe conditions in service.

The first object of the present invention is to provide such lightweight material that will fulfill these requirements and having a specific gravity in the range of 0.2 to 0.8, and preferably of 0.4 to 0.6, a second object of the invention is to provide such a said material providing the chemical stability usual for said type of substances, and further improved mechanical properties at least equal to those of given metals.

Another object of the invention is to provide such a material from polystyrene.

A further object of the invention is to provide a process for manufacturing a lightweight material by shaping a mass of polystyrene with an admixture of a gas-producing agent under high pressure and at elevated temperature.

A still further object of the present invention is to provide a process for the manufacture of a lightweight cellular material by discharging a blast of gas under high pressure into a mass of molten polystyrene.

A polystyrene lightweight material or composition according to the invention provides the following average characteristics, as measured at a temperature of 15° C.:

Specific gravity: 0.55 (from 0.2 to 0.8, preferably from 0.4 to 0.6).
Compression strength: Yield point 226 kg./cm.$^2$ (from about 180 to 300 kg./cm.$^2$); elastic deformation at yield, 8% (from 7 to 10%).
Tensile strength: Yield point, 164 kg./cm.$^2$ (from about 125 to 210 kg./cm.$^2$); elastic elongation at yield, 2% (from about 1 to 3%).
Impact strength: 5 to 6 kg. cm./cm.$^2$/cm.
Bending strength: 219 kg./cm./cm.$^2$ (from about 200 to 240 kg./cm./cm.$^2$).
Elasticity modulus, bending: 129 kg. f./mm.$^2$ (from about 110 to 150 kg. f./mm.$^2$).
Temperature of deflection (under a load of 18.5 kg./cm.$^2$): 71° C. (from about 60° to 75° C.).
Resistance to pressure applied in all directions: 300 to 500 kg./cm.$^2$.
Perfect imperviousness to water.
Perfect resistance to attack by bacteria or molds.
Resistance at low temperatures: The above characteristics remain unmodified.

The material is suitable for working by sawing, moulding, turning on a lathe, drilling, milling and other conventional machining operations. It can be adhesively bonded, welded, and shaped by extrusion, hot deformation and other methods.

It will be apparent that a composition having the above characteristics will have many uses as a replacement for wood and certain metals, of which the improved composition has most of the advantages without presenting the corresponding drawbacks. The range of applicability of the composition of the invention is very wide. Thus it may be used for example as protecting sheets or structural members in the manufacture of building elements such as door and window frames, door and window and wall panels, and furniture. Another field of useful applications is in connection with the naval arts, such as the making of buoys, floats, etc., which will be sufficiently strong mechanically per se without requiring protective shielding. In view of its exceptionally high pressure resistance, the lightweight material according to the invention can be immersed in great depths of water.

The method of producing the improved composition according to the invention may comprise heating and extruding a mixture of divided polystyrene material with a minor proportion of at least one gas-producing agent (designated as spumigene), eventually with a small quantity of a plasticizer.

The polystyrene material may be in the form of beads having a diameter up to 0.3 mm., or crushed to powder.

The spumigene may comprise at least one substance of the group consisting of dinitrosopentamethylenetetramine, carbon dioxide, nitrogen, volatilizable and vaporizable substances such at petroleum ether, petrol. Dinitrosopentamethylenetetramine is used in quantities from 2 to 4%, petroleum ether and gasoline in quantities from 1 to 2%, of the weight of polystyrene worked up. The mixture is extruded or shaped in any other suitable machine at suitable temperature to produce a continuous element which tends to swell and can readily be held to the desired shape by means of a conventional shaping form until it has cooled sufficiently to be dimensionally stable.

The above indicated contents of spumigenes are provided for working with an extruder of average length and diameter. It has been experimentally found that relations exist between the spumigene, the diameter of the cells in the final material, the dimension of the extruder and the heating length. Further, it has been found that an excess of spumigene is advantageously used. It has also been observed that with a constant quantity of spumigene, variations can be obtained in the specific gravity of the product by modifying the extruding temperature. The dies employed are prepared as usually.

According to the invention, when operating with an average length extruder, the working temperatures are preferably maintained between 190 and 200° C. for the middle portion and from 140 to 150° C. at the die.

One type of apparatus that has been found to be especially satisfactory in the manufacture of the improved composition is an extruding press of the type having a presser screw acting on the charge of material in the press chamber to extrude said charge (the above mixture) through a die orifice having the desired sectional shape. In one embodiment of such apparatus for the purposes of the invention, the machine is provided with a hollow extrusion screw, the cavity of which communicates with the extrusion chamber by way of transversely drilled ports opening into the bottom of the screw thread at a suitable point along the length of the screw, at about the second third of its length. The polystyrene is conventionally charged and a blast of high pressure gas, e.g., nitrogen, or carbon dioxide is discharged into the mass of polystyrene material in course of the extrusion, whereby the gas is emulsified through the moving material; the extruded material is swollen and as lightweight material is then treated as above stated to take the desired shape for instance in a known conforming device provided with rubber rolls.

A volatilizable substance, inert to polystyrene may also be introduced into the cavity of the screw.

A few practical examples will now be described to illustrate the process of the invention.

*Example 1*

An extrusion press was charged with the following mixture:

| | Parts by weight |
|---|---|
| Polystyrene in 0.2 mm. beads | 100 |
| Dinitrosopentamethylenetetramine | 4 |
| Butyl stearate | 0.1 |

The press was heated to provide approximately a temperature of 150° C. at the inlet, 190° in the centre and 140° at the outlet of the die. When the extrusion press was operated there was obtained at the die outlet a continuous length of expanding material which on cooling set to a cellular mass having the characteristics described above.

It will be noted from this example that the proportion of foaming or gas-producing agent employed greatly exceeded that theoretically required. This was necessary because of the fact that the presser screw of the extrusion machine, while it acts on one hand to emulsify the gas in the molten plastic material, acts at the same time to discharge a substantial proportion of the gas through the inlet of the machine.

*Example 2*

The same extrusion press provided with the perforate screw construction described above was supplied with the following charge:

| | Parts by weight |
|---|---|
| Polystyrene beads | 99.9 |
| Octyl stearate | 0.1 |

A blast of nitrogen gas under a pressure of 120 hectopiezes was discharged through the perforate screw. The temperatures in the press were 150° C., 195° and 135° respectively. The characteristics of the resulting product in this case were:

| | |
|---|---|
| Specific gravity | 0.40. |
| Compression yield point | 205 kg./cm.$^2$. |
| Tensile yield point | 105 kg./cm.$^2$. |
| Impact strength | 5 kg. cm./cm. cm.$^2$. |

*Example 3*

The same extrusion press as above and provided with the perforate presser screw construction earlier described, was supplied with the same mixture as in Example 2. During the extrusion process heptane gas was continuously discharged into the extrusion chamber through the perforate screw at a rate of 10 grams heptane per kilogram polystyrene.

The temperatures in this case were held at 140° C., 195° and 135° respectively. The extruded element issuing from the extrusion die nozzle has the following chief mechanical characteristics:

| | |
|---|---|
| Specific gravity | 0.60. |
| Compression yield point | 205 kg./cm.$^2$. |
| Tensile yield point | 180 kg./cm.$^2$. |
| Impact strength | 6 kg. cm./cm. cm.$^2$. |

By passing through the suitable conforming device, the extruded material may be brought to any required form. For instance tubes are obtainable by using a die with helicoidal outlet, so that the windings of the helix stick together.

What we claim is:

1. A lightweight cellular material consisting essentially of polystyrene, having the following average characteristics, as measured at 15° C.:

Specific gravity: from about 0.4 to 0.6,
Compression strength: Yield point from 180 to 300 kg./cm.$^2$; elastic deformation at yield 7 to 10%,
Tensile strength: Yield point from 125 to 210 kg./cm.$^2$; elastic elongation at yield from about 1 to 3%,
Impact strength: 5 to 6 kg. cm./cm.$^2$/cm.,
Bending strength: 200 to 240 kg. f./cm. cm.$^2$,
Elasticity modulus, bending: from about 110 to 150 kg. f./mm.$^2$,
Temperature of deflection under a load of 18.5 kg./cm.$^2$: from about 60 to 75° C.,
Perfect imperviousness to water,
Perfect resistance to attack by bacteria and molds,
Resistance at low temperatures: unmodified.

2. A material consisting essentially of foamed polystyrene having a specific gravity about 0.4 to 0.6 with following average characteristics, as measured at a temperature at 15° C.:

Specific gravity: 0.55,
Compression strength: Yield point 226 kg./cm.$^2$; elastic deformation at yield, 8%,
Tensile strength: Yield point, 164 kg./cm.$^2$; elastic elongation at yield, 2%,
Impact strength: 5 to 6 kg. cm./cm. cm.$^2$,
Bending strength: 219 kg. cm./cm.$^2$,
Elasticity modulus, bending: 129 kg./mm./mm.$^2$,
Temperature of distortion: 71° C.,
Resistance to pressure applied in all directions: 300 to 500 kg./cm.$^2$.

References Cited by the Examiner

UNITED STATES PATENTS

| | | | |
|---|---|---|---|
| 2,386,995 | 19/1945 | Wigal | 260—2.5 |
| 2,409,910 | 10/1946 | Stober | 260—2.5 |
| 2,515,250 | 7/1950 | McIntire | 260—2.5 |
| 2,576,977 | 12/1951 | Stober | 260—2.5 |
| 2,669,751 | 2/1954 | McCurdy et al. | 260—2.5 |
| 2,744,291 | 5/1956 | Stastny et al. | 260—2.5 |
| 2,806,255 | 9/1957 | Dietz | 260—2.5 |
| 2,857,342 | 10/1958 | Platzer | 260—2.5 |
| 2,860,377 | 11/1958 | Bernhardt et al. | 260—2.5 |
| 2,928,130 | 3/1960 | Grey | 260—2.5 |
| 2,941,965 | 6/1960 | Ingram | 260—2.5 |
| 2,945,828 | 7/1960 | Henning | 260—2.5 |
| 3,026,272 | 3/1962 | Rubens et al. | 260—2.5 |

SAMUEL H. BLECH, *Primary Examiner.*

DONALD ARNOLD, LEON J. BERCOVITZ, MURRAY TILLMAN, *Examiners.*

UNITED STATES PATENT OFFICE
CERTIFICATE OF CORRECTION

Patent No. 3,219,597                                November 23, 1965

Pierre Emile Boutillier et al.

It is hereby certified that error appears in the above numbered patent requiring correction and that the said Letters Patent should read as corrected below.

Column 3, line 62, for "205" read -- 250 --; column 4, line 46, for "19/1945" read -- 10/1945 --.

Signed and sealed this 26th day of July 1966.

(SEAL)
Attest:

ERNEST W. SWIDER                            EDWARD J. BRENNER
Attesting Officer                                Commissioner of Patents